June 30, 1931.  J. C. PALMER  1,812,166
POULTRY FEEDER
Filed Feb. 17, 1930

Inventor
John C. Palmer.
By A. J. O'Brien
Attorney

Patented June 30, 1931

1,812,166

UNITED STATES PATENT OFFICE

JOHN C. PALMER, OF EDGEWATER, COLORADO

POULTRY FEEDER

Application filed February 17, 1930. Serial No. 428,999.

This invention relates to improvements in feeding devices for poultry.

Poultry raisers have always found more or less difficulty in obtaining feeding devices that were satisfactory in operation because in the majority of cases the feeders are so constructed that they permit the hens to waste a large proportion of the feed, and in other instances, the feed becomes blocked within the hopper so that it does not feed into the feed box.

It is the object of this invention to produce a feeding device that shall be especially well adapted for use by poultry raisers and which shall be so constructed that the wastage of feed will be practically eliminated.

Another object of this invention is to produce a device of the type referred to in which an agitator is provided in the feed hopper and which is connected to movable roost boards in such a manner that the hens will operate the agitator whenever they hop onto the feeder.

Another object of this invention is to produce a feeding device which shall be provided with means that will prevent the hens from roosting on the feed hopper and thus prevent them from fouling the feed.

The above and other objects that may become apparent as the description proceeds are attained by means of a construction and an arrangement of parts that will now be described in detail, reference for this purpose being had to the accompanying drawings in which the preferred embodiment of the invention has been illustrated and in which.

Figure 1:
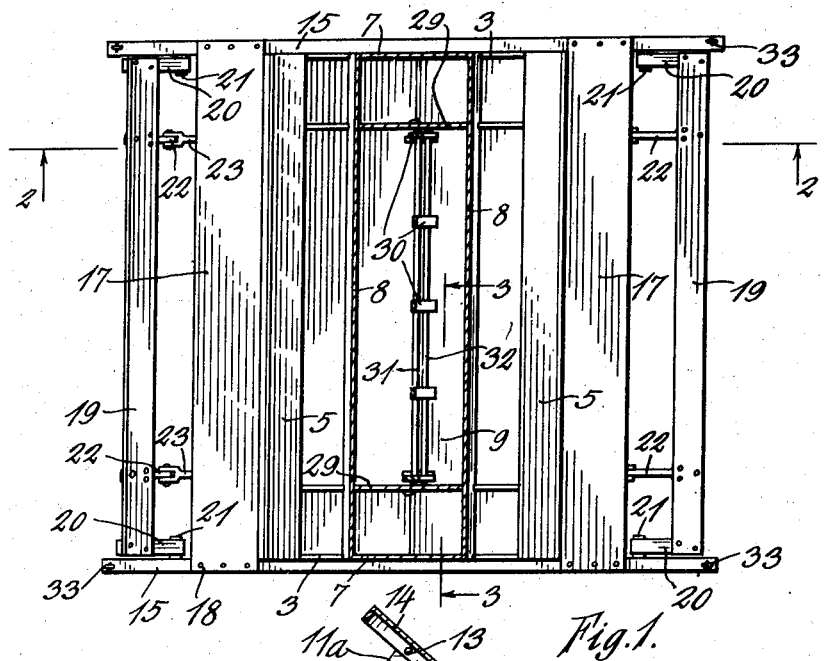
Fig. 1 is a section taken on line 1—1, Fig. 2, and shows a top plan view of the lower portion of the feeding device.
Figure 2:
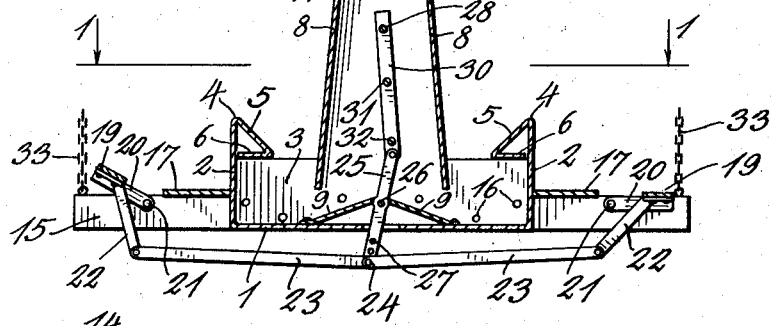
Fig. 2 is a section taken on line 2—2, Fig. 1.
Figure 3:
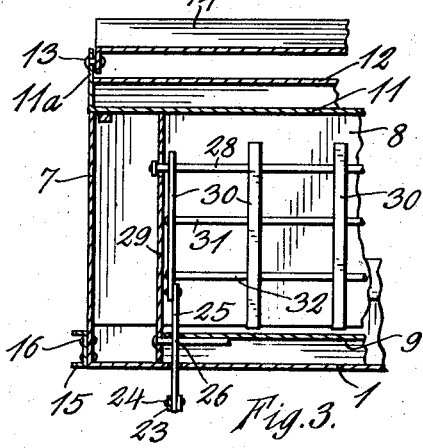
Fig. 3 is a section taken on line 3—3, Fig. 1.

The feeding device which forms the subject of this invention consists of a rectangular box which is preferably made from sheet metal and which has a bottom 1, side members 2 and ends 3. The sides can be of any desired length, but the width must necessarily be limited. The upper ends of sides 2 project upwardly to a point above the upper edge of the ends and are then bent inwardly and downwardly along line 4, thus forming downwardly and inwardly inclined guard surfaces 5 that project over the box in the manner shown in Fig. 2. The lower ends of sides 5 may be bent outwardly as indicated by numeral 6, although this is not considered to be necessary.

Secured to the ends 3 is a feed hopper. The ends of this feed hopper have been indicated by reference numeral 7 and may be formed integral with the end members 3 or may be made from separate sheets of metal secured to the end members as may be desired. The hopper has two upwardly and inwardly inclined sides 8, whose lower ends terminate within the feed box a short distance above the bottom of the latter so that openings will be provided through which the feed can enter the feed box. Secured to the upper surface of bottom 1 is a convex sheet metal member having two inclined sides 9 whose apex lies in a plane bisecting the angle between sides 8. The inclined sides 9 form the bottom of the feed hopper and direct the feed outwardly into the open parts of the feed box. Secured to the upper end of one of the sides 8 by means of hinges 10 is a cover 11. This cover is provided with a top formed from a piece of sheet metal bent longitudinally so as to have inclined sides 12 and this is secured to the cover in the manner shown in Fig. 2. The cover 11 is provided with upwardly extending end members 11a that project upwardly beyond the top of the sides 12 and are provided with openings for the reception of pivots 13. A plate 14 extends between the upper ends of the end members 11a and is pivoted to the latter in the manner shown in Fig. 2. The object of this construction will appear as the description proceeds.

Secured to the ends 3 of the feed box are supporting bars 15 that are preferably made from steel channels and are secured to the ends of the box by means of rivets 16. Roost boards 17 are secured to the upper flanges of the channels by means of bolts 18 and these boards form supports for the chickens while they are feeding. At the outside of each of the boards 17, I have provided a roost bar 19.

These bars have secured to each end thereof short arms 20 that are connected to the channels by means of pivots 21. Other short arms 22 are connected to the under side of each roost bar and extend downwardly in the manner shown in Fig. 2. Links 23 are pivotally connected to the lower ends of arms 22 and have their inner ends pivotally connected at 24 to the lower end of lever 25. This lever is pivoted at 26 and extends a short distance above the upper surfaces of the inclined bottom members 9. The lower ends of levers 25 are provided with a plurality of openings 27 so that the pivot pins 24 can be moved upwardly or downwardly in an effort to obtain the adjustment most suitable for the particular feed employed in the hopper. Located within the hopper is an agitator. This agitator consists of a rod 28 that extends through elongated openings in the partition members 29. Flat bars 30 are secured to the rod 28 at spaced intervals and these have openings for the reception of rods 31 and 32. The upper ends of levers 25 are pivotally connected with the lower ends of the end bars 30 of the agitator and therefore when the roost bars 19 are moved upwardly and downwardly about their pivots 21, the agitator comprising parts 28, 30 and 31 is rocked about the axis of the supporting bar 28. The extent of this rocking motion can be regulated by moving the pivot 24. The feeder is suspended above the floor by means of chains 33 and when the chickens hop onto the feeder, they will invariably light on the roost bars 19 and when a hen lights on the roost bar that is in the elevated position, its weight will move this bar downwardly and will rock the agitator, thus assuring that feed will always be moving into the open part of the feed box. During the feeding, the hens will stand on the boards 17 and any feed that is raised by the hens while feeding will fall onto the inclined surfaces 5 and will be returned to the feed box. The guard surfaces 5 can be quite wide and it is therefore possible to prevent almost entirely, the waste of feed.

After the hens have eaten all the feed that they desire, it is customary for them to fly onto the top of the hopper and roost in this position. In order to prevent this I have provided a pivoted board 14 and when a hen flies up and alights on the upper edge of this board, the board will tilt and the hen will fall down and will finally discouraged from roosting on the hopper. The inclined surfaces 12 are provided for the purpose of making it impossible for a hen to stand on the cover because if the top of the cover were flat it would be possible for a hen to stand on this flat surface, even if the the board 14 were provided as shown. By providing the hopper and feed box with two partitions 29, three compartments are formed. The center compartment can be used for the ordinary feed mix and the end compartments can be used for oyster shells and gravel, or for any other articles that are employed in the feeding of chickens.

With the arrangement shown and described, only a small area of the feed surface is visible to the hen as she feeds and therefore it is not possible for the hen to select the portions of the feed that may appeal most to her, but she will be obliged to eat the mixture as it is formed. Where hens are fed out of troughs where they have a chance to see a large part of the feed surface, they soon get in the habit of stirring up the feed and selecting only such portions thereof as appeals to them, with the result that they do not get the proper mixture and this causes them to become sick.

I want to call particular attention to the guard surfaces 5 that are downwardly and inwardly inclined, as this prevents almost entirely the wastage of feed for the reason that the hens in billing the feed are not able to throw the feed high enough to pass over this inclined surface and it therefore returns to the feed box.

Another important feature of this invention is the automatic operation of the agitator caused by the hens alighting on the roost bars 19.

Another important feature raised is the means employed for preventing the hens from roosting on the feed hopper. Where the hens are permitted to roost on the feed hoppers, this becomes such a favorite place of roosting that the feed is always fouled and this is highly objectionable.

From the above description it will be apparent that I have produced an automatic feeding device of a simple construction that has some very desirable features, and which saves a large percentage of the feed and with the construction shown and described, it is practically impossible for feed to be thrown out on the floor during the feeding operation.

Although the device has been shown as made from sheet metal, it can be made from wood or any other suitable material, but sheet metal is believed to be the most desirable material for the construction of this device.

Having described my invention what is claimed as new is:

1. A poultry feeder comprising, in combination, a substantially rectangular box open at the top, the two oppositely located sides being provided with guard members whose upper surfaces are upwardly and outwardly inclined, a feed hopper extending between the ends of the box and substantially parallel with the sides having the guards, a supporting bar secured to each of the ends of the box, the ends of the bars projecting beyond the sides of the box, a roost bar mounted for oscillation between the supporting bars, an agitator located within the feed hopper, and means for operating the agitator when the roost bar moves about its pivot.

2. A poultry feeder comprising, in combination, a substantially rectangular box open at the top, the two oppositely located sides being provided with guard members whose upper surfaces are upwardly and outwardly inclined, a feed hopper extending between the ends of the box and substantially parallel with the sides having the guards, a supporting bar secured to each of the ends of the box, the ends of the bars projecting beyond the sides of the box, a roost board located along the outside of each of the sides having the guards, a roost bar located adjacent each roost board and pivotally attached at its ends to the supporting bars, an agitator located within the hopper, and means for interconnecting each of the roost bars with the agitator so that the latter will be operated when either of the roost bars are moved about their pivots.

In testimony whereof I affix my signature.

JOHN C. PALMER.